3,060,989
BLENDS OF CIS-POLYBUTADIENE WITH EITHER
NATURAL RUBBER OR CIS-POLYISOPRENE,
METHOD OF PREPARING SAME, AND TIRE
TREAD COMPRISING SAME
Henry E. Railsback and Nelson A. Stumpe, Jr., Bartlesville, Okla., assignors to Phillips Petroleum Company, a corporation of Delaware
No Drawing. Filed Aug. 17, 1959, Ser. No. 833,975
10 Claims. (Cl. 152—330)

This invention relates to blends of cis-polybutadiene with natural rubber and with cis-polyisoprene.

This is a continuation-in-part of our copending application Serial No. 751,150, filed July 28, 1958, now abandoned, for Blends of Cis-Polybutadiene with Natural Rubber. Application Serial Number 751,150 was a continuation-in-part of our application Serial Number 699,187 (now abandoned), filed on November 27, 1957.

Various methods are described in the literature for polymerizing 1,3-butadiene, including emulsion polymerization, alkali metal-catalyzed polymerization, and alfin-catalyzed polymerization. Emulsion polymerization of 1,3-butadiene gives a polymer with from about 60 to about 80 percent trans 1,4-addition, from about 5 to about 20 percent cis 1,4-addition, and from about 15 to about 20 percent 1,2-addition. Sodium-catalyzed polybutadiene has from about 60 to about 75 percent 1,2-addition, the remainder being cis and trans 1,4-addition. When potassum and other alkali metals are employed as catalyst, the latter ratios may vary to some degree, but no polybutadiene prepared in presence of the alkali catalyst containing more than about 35 percent of cis 1,4 configuration has been obtained. Alfin-catalyzed polybutadiene has from about 65 to about 75 percent trans 1,4-addition, from about 5 to about 10 percent cis 1,4-addition, and from about 20 to about 25 percent 1,2-addition. For a more complete discussion of the configuration of polybutadiene, reference is made to an article by J. L. Binder appearing in Industrial and Engineering Chemistry No. 46, 1927 (August 1954).

Natural rubber has long been a commodity of commerce, and the art is well aware of such natural rubbers. The most widely used rubber latex is that gathered from the tree *Hevea brasiliensis*. It is generally accepted today that natural rubber is substantially a cis-polymer of isoprene (2-methyl-1,3-butadiene). It is also known to the art that natural rubber fluctuates widely in price, but has generally been more expensive than the synthetic rubbers, especially since World War II when the production of various synthetic rubbers has increased many fold.

Various synthetic rubbers and natural rubbers have been blended with each other and with fillers for various purposes. However, when synthetic rubber and natural rubber are blended, the properties of the blend generally trend toward the poorer of the two components. This is especially true in respect to heat build-up and flex life, and, consequently, the use of blends of synthetic rubber with natural rubber in utilities where natural is normally used alone has not proven satisfactory.

Although natural rubber has been utilized for a number of years in a multitude of applications, one of the largest uses at the present time is in the manufacture of truck tires. While certain synthetic rubbers, SBR (styrene/butadiene copolymer rubber) for example, show superior tread wear, natural rubber is superior in hysteresis properties. The poorer hysteresis of synthetic rubber, or blends of previously known synthetic rubbers with natural rubber, results in premature failure on account of heat blowouts, particularly in heavy duty tires. This problem is so acute that practically all large truck tires are made using natural rubber. The supply of natural rubber has been short in the past several years, and with the production of automobile and truck tires being increased every year, it is easily foreseen that the supply of natural rubber will become even shorter.

It is known in the art that butadiene can be polymerized to polymers consisting primarily of cis-1,4-configuration. However, while the polybutadienes containing substantial amounts of cis 1,4-configuration have excellent utility in many applications, the higher Mooney polybutadienes (ML-4 at 212° F. of 50 and above) have exhibited poorer processing characteristics than SBR or natural rubber, e.g., are more difficult to mill. These cis-polybutadienes have excellent hysteresis properties, but it would be desirable if the tensile strength of these polymers could be increased significantly.

It has now been found that blends of these cis-polybutadienes with natural rubber and with cis-polyisoprene have good hysteresis properties, low heat build-up, good flex life, and good tensile strength.

It is therefore an object of this invention to provide blends of cis-polybutadiene with natural rubber and with cis-polyisoprene which can be utilized in the applications for which natural rubber alone is used at the present time.

It is another object of this invention to provide blends of cis-polybutadiene with natural rubber and with cis-polyisoprene, which exhibit good hysteresis properties, good tensile strength, good flex life and low heat build-up.

It is another object of this invention to provide a means of extending natural rubber without sacrificing its desirable properties for tires, especially heavy duty types.

It is still another object of this invention to provide blends containing cis-polybutadiene, which have good processing properties.

Still other objects, advantages and features of this invention will be apparent to those skilled in the art upon consideration of this disclosure.

The above and other objects of this invention are accomplished by preparing a blend of rubber containing 10 to 90 parts per 100 parts by weight rubber of a synthetic polybutadiene containing at least 75 percent butadiene joined together by cis 1,4 linkage, the remainder being chiefly a cis-polyisoprene, i.e., natural rubber or a synthetic cis-polyisoprene containing at least 75 percent isoprene joined together by cis 1,4-linkage. Of course, additives such as carbon black, antioxidants, softeners and other additives and preservatives known in the art can be present in the blend.

The cis-polybutadienes which are utilized in the rubber compositions of this invention can be produced by any of the known polymerization processes which yield predominantly cis-1,4-butadiene polymers. The cis-polybutadiene which can be employed in the rubber compositions of this invention will have a viscosity between 10 and 130 as measured on the Mooney viscosimeter at 212° F. (ML–4). A more desirable range of Mooney viscosity is from 20 to 60, inclusive. The polybutadiene as contemplated herein is one in which at least 75 percent and up to 100 percent, preferably 85 to 98 percent, of the polymer is formed by cis 1,4-addition of the butadiene, the remainder of the polymer being formed by trans 1,4- and 1,2-addition of the butadiene. The amount of the cis-polybutadiene which is employed in the blends of this invention, the cis 1,4 content of the polymer, and the Mooney viscosity of the cis-polybutadiene will all depend upon the desired ultimate use of the blend and the physical properties desired for the ultimate use. In general, the blend will contain at least 10 weight percent natural rubber or cis-polyisoprene and preferably at least 25 weight percent. A particularly preferred range is 50 to 60 weight percent natural rubber or cis-polyisoprene and 50 to 40 weight percent of the cis-polybutadiene.

As has been indicated the cis-polybutadiene useful in this invention can be prepared by any method known to the art, this invention being in the blended composition. One means for preparing such polymers is fully described and claimed in the copending application of David R. Smith and Robert P. Zelinski filed April 16, 1956, and having Serial No. 578,166. According to that application, 1,3-butadiene is polymerized in the presence of a catalyst composition comprising (a) a trialkylaluminum, and (b) titanium tetraiodide. The polybutadiene produced by that method is one in which the rubbery polymer is formed by cis 1,4-addition, trans 1,4-addition and 1,2-addition, at least 85 percent of the polymer being formed by cis 1,4-addition.

The trialkylaluminum in the Smith et al. catalyst can be represented by the formula $R_3Al$, wherein R is an alkyl radical containing up to and including 6 carbon atoms. The alkyl groups can be either straight or branched chain alkyl, for example, ethyl, propyl, isopropyl, n-butyl, isobutyl, pentyl, isohexyl and n-hexyl etc. The alkyls can be the same or different, e.g., diisobutylmonoethylaluminum; however, the preferred catalyst comprises titanium tetraiodide and triethylaluminum or triisobutylaluminum since these latter two alkylaluminums have high activity in the process. The amount of trialkylaluminum in the catalyst composition is usually in the range 1.25 to 50 mols per mol of titanium tetraiodide with the preferred range being from 1.5 to 35 mols per mol. When triisobutylaluminum is utilized, the preferred range is 1.7 to 35 mols per mol whereas when triethylaluminum is employed the preferred range is 1.5 to 10 mols per mol. The total amount of catalyst can vary over a wide range. The concentration of the total catalyst, titanium tetraiodide plus trialkylaluminum, is usually in the range of about 0.05 weight percent to 10.0 weight percent or higher, preferably in the range 0.05 to 5 weight percent, based on the total amount of 1,3-butadiene charged to the reaction zone. In general, at the lower mol ratio of trialkylaluminum to titanium tetraiodide, it is desirable to operate above the minimum level of catalyst concentration.

The polymerization of the butadiene can be carried out at any temperature in the range of −40° C. to 150° C., but it is preferred to operate in the range of −10° to 50° C. It is also preferred to carry out the polymerization in the presence of an inert hydrocarbon such as aromatics, straight and branched chain paraffins and cycloparaffins although cycloparaffins are less desirable than the other hydrocarbons. The reaction can be carried out in the absence of any such diluent. The polymerization reaction can be carried out under autogenous pressure or any suitable pressure sufficient to maintain the reaction mixture substantially in the liquid phase. The pressure will thus depend upon the particular diluent being employed and the temperature at which the polymerization is being carried out. However, higher pressures can be employed if desired, these higher pressures being obtained by some such suitable method as the pressurization of the reactor with a gas which is inert with respect to the polymerization reaction.

As has been indicated, natural rubber is well known to the art and no further discussion thereof is needed here.

The cis-polyisoprenes used in the rubber composition of this invention can be produced by any of the known polymerization processes which yield a predominantly cis 1,4-polymer of isoprene. The cis-polyisoprene is one in which at least 75 percent and up to 100 percent, preferably 85 to 95 percent, of the polymer is formed by cis 1,4-addition of the isoprene, the remainder of the polymer being formed by trans 1,4-, 3,4-, and 1,2-addition of the isoprene. The amount of the polyisoprene formed by 1,2-addition is usually negligible, being in most instances difficult or impossible to detect by infrared examination.

In one method for preparing cis-polyisoprene, the isoprene is polymerized in the presence of a catalyst composition comprising (a) a trialkylaluminum and (b) titanium tetrachloride. The trialkylaluminum can be represented by the formula $R_3Al$, wherein R is an alkyl radical as described hereinbefore. The polymerization is preferably carried out in the presence of a hydrocarbon diluent similar to that mentioned above. The amount of titanium tetrachloride used in the catalyst composition is usually in the range of 0.05 to 20 mols per mol of trialkylaluminum. However, a preferred range is from 0.1 to 3.0 mols of the titanium tetrachloride per mol of trialkylaluminum. The process for preparing the cis-polyisoprene can be carried out at any temperature within the range of −100° C. to 100° C., but it is preferred to operate in the range of −50° C. to 50° C. The polymerization reaction can be carried out under autogenous pressures. It is usually desirable to operate at pressures sufficient to maintain the monomeric material substantially in the liquid phase. The amount of the catalyst composition used in the polymerization can vary over a wide range. The concentration of the total catalyst composition is usually in the range of about 0.01 weight percent to 15.0 weight percent, or higher, based on the amount of isoprene charged to the polymerization zone. A polyisoprene prepared by this method is formed by cis 1,4-addition, trans 1,4-addition, 3,4-addition and 1,2-addition, at least 90 percent of the polymer usually being formed by cis 1,4-addition.

It is to be understood that it is not intended to limit the invention to cis-polybutadienes or cis-polyisoprenes which have been prepared by any particular method. Thus, the present invention is applicable to any cis-polybutadienes and cis-polyisoprenes having the above-described configurations. Another method which can be used to produce cis-polybutadienes suitable for use in preparing the blends of this invention is described in copending U.S. patent application Serial No. 722,842, filed on March 21, 1958, by F. E. Naylor, now Patent No. 3,004,018. As disclosed in this application in detail, a catalyst comprising a mercury or zinc-alkyl and titanium tetraiodide is effective in polymerizing 1,3-butadiene to a cis-polybutadiene. Furthermore, other catalyst systems, e.g., those containing elemental lithium or lithium hydrocarbon, such as alkyllithiums are suitable for use in preparing cis-polyisoprene by the polymerization of isoprene.

The blends of this invention can be prepared in a variety of ways, but the preferred method for admixing these cis-polybutadienes with natural rubber or cis-polyisoprene is with mechanical mixers such as roll mills or Banburys, either with or without plasticizers, peptizers or other processing aids. After admixing the natural rubber or cis-polyisoprene with the cis-polybutadiene in the desired ratio, the resulting blend can be compounded and vulcanized by well known rubber vulcanization recipes, as for example, sulfur plus an accelerator at 307° F. for 30 minutes. Alternatively, each polymer can be compounded separately and the compounded stocks blended to give the desired ratio of cis-polybutadiene to natural rubber or cis-polyisoprene in the final blend. The resulting blends, after vulcanization, have excellent physical properties, and show particular advantages in their low heat build-up, good flex life, good abrasion resistance, and good resistance to aging (cracking, etc.). A still further advantage in the blends of this invention is their processability. While cis-polybutadienes having a Mooney value of 50 or above (ML-4 at 212° F.) are difficult to mill, the blends of this invention mill well on a roll mill. Other blending methods include blending solutions of the two rubbers and recovering the blend from solution.

EXAMPLES

Several runs were made to illustrate the advantage of the blends of this invention. These runs are presented to illustrate the rubber compositions of this invention but are not intended to limit the invention to the embodiment shown therein.

*Example I*

Several runs were made by blending cis-polybutadiene prepared with triisobutylaluminum and titanium tetraiodide catalyst and natural rubber #1 Smoked Sheet (#1 S.S.).

The cis-polybutadiene was prepared by the method of Smith et al. in toluene diluent utilizing a mol ratio of triisobutylaluminum (TIBA) to titanium tetraiodide (TTI) of about 5/1. Three different cis-polybutadienes were used in these blends, these polymers having the following cis 1,4-content.

| | Cis 1,4-addition, percent [2] |
|---|---|
| Polymer A [1] | 81.7 |
| Polymer B | 89.0 |
| Polymer C | 93.5 |

[1] Blend of three polymers in approximately equal proportions. In the preparation of one of these polymers a 7.5/1 mol ratio of triisobutylaluminum to titanium tetraiodide was utilized, whereas a 5/1 mol ratio was utilized in the preparation of the other two.

[2] In determining the percentage of the polymer formed by cis 1,4-addition, the following procedure was followed. The polymers were dissolved in carbon disulfide containing 0.01 gram of phenyl-beta-naphthylamine per liter of carbon disulfide to form a solution containing 2.5 weight percent of the polymer. If the polymer as prepared contained antioxidant, it was removed by reprecipitating the polymer twice from cyclohexane prior to preparing the carbon disulfide solution. The infrared spectrum of each of the solutions (percent transmission) was then determined in a commercial infrared spectrometer. The percent of the total unsaturation present as trans 1,4- was calculated according to the following equation and consistent units:

$$\epsilon = \frac{E}{tc}$$

where: $\epsilon$ = extinction coefficient (liters-mols$^{-1}$-microns$^{-1}$); $E$ = extinction (log $Io/I$); $t$ = path length (microns); and $c$ = concentration (mols double bond/liter). The extinction was determined at the 10.35 micron band and the extinction coefficient used was $1.21 \times 10^{-2}$ (liters-mols$^{-1}$-microns$^{-1}$). The percent of the total unsaturation present as 1,2- (or vinyl) was calculated according to the above equation, using the 11.0 micron band and an extinction coefficient of $1.52 \times 10^{-2}$ (liter-mols$^{-1}$-microns$^{-1}$). The percent of the total unsaturation present as cis 1,4- was obtained by subtracting the trans 1,4- and 1,2-(vinyl) determined according to the above methods from the theoretical unsaturation assuming one double bond per each C$_4$ unit in the polymer. In the case of Polymer A, the value given is an average value calculated from the structure of each of the polymers of the blend.

The polybutadiene-natural rubber blends were made up by milling the cis-polybutadiene on a roll mill and thereafter milling in the smoked sheet. The blends were then compounded according to the following recipes, followed by curing at 307° F. for 30 minutes. It was noticed that the 60 and 54 Mooney (ML-4) cis-polybutadienes (Polymers B and C, see Table I) did not band at the mill temperature employed (158° F.), but after adding the natural rubber, the mixture banded very satisfactorily at 158° F.

COMPOUNDING RECIPES

| | Cis-polybutadiene | | | No. 1 smoked sheet |
|---|---|---|---|---|
| | I | II | III | IV |
| Polymer | 100 | 75 | 50 | ------ |
| No. 1 smoked sheet | ------ | 25 | 50 | 100 |
| High abrasion furnace black | 50 | 50 | 50 | 50 |
| Zinc oxide | 4 | 4 | 4 | 4 |
| Stearic acid | 3 | 3 | 3 | 3 |
| Antioxidant [1] | 1 | 1 | 1 | 1 |
| Disproportionated rosin | 5 | 5 | 5 | ------ |
| Pine tar | 3 | 3 | 3 | ------ |
| Sulfur | 1.75 | 1.75 | 1.75 | 1.75 |
| n-Cyclohexyl-2-benzothiazole-sulfenamide | 1.0 | 0.85 | 0.7 | 0.4 |

[1] Physical mixture containing 65% by weight of a complex diarylaminoketone reaction product and 35% by weight of N,N'-diphenyl-p-phenylenediamine.

After curing, the physical properties of the blends were determined. The results of these tests are given in Table I.

From the table, it can be seen that the heat build-up, tensile strength, flex life, etc., of the blend, especially the 50/50 blends, is essentially as good as that of the smoked sheet alone.

TABLE I

| | Polymer A (81.7% cis-1,4); Mooney viscosity (ML-4), 18 | | | Polymer B (89.0% cis-1,4); Mooney viscosity (ML-4), 60 | | | Polymer C (93.5% cis-1,4); Mooney viscosity (ML-4), 54 | | | Natural rubber alone (control) |
|---|---|---|---|---|---|---|---|---|---|---|
| Run No | 1 | 2 | 3 | 4 | 5 | 6 | 7 | 8 | 9 | 10 |
| Parts by weight: | | | | | | | | | | |
| Cis-polybutadiene | 100 | 75 | 50 | 100 | 75 | 50 | 100 | 75 | 50 | 0 |
| Natural rubber | 0 | 25 | 50 | 0 | 25 | 50 | 0 | 25 | 50 | 100 |
| Processing Data | | | | | | | | | | |
| Compounded Mooney (MS 1½ at 212° F.)[1] | 24.5 | 28 | 32.5 | 68.5 | 62.5 | 47 | 60 | 58.5 | 49.5 | 48 |
| Scorch at 280° F.,[2] minutes to 5 point Mooney rise | 14.5 | 13.5 | 13.5 | 10.5 | 11.5 | 12.5 | 10 | 11 | 11.5 | 11.5 |
| Extrusion at 250° F.:[3] | | | | | | | | | | |
| Inches/min | 45.8 | 50.1 | a 45.5 | 20.3 | 28.1 | 35.6 | 33.4 | 36.3 | 40.8 | 51.5 |
| Grams/min | 94 | 101.5 | a 85.0 | 37.5 | 68.0 | 87.0 | 71.0 | 81.5 | 90.0 | 95.0 |
| Appearance rating | 11 | 11+ | 11 | 6 | 7− | 9− | 6− | 6+ | 9+ | 11− |

See footnotes at end of table.

TABLE I—Continued

Cured 30 Minutes at 307° F.

|  | Polymer A (81.7X cis-1,4); Mooney viscosity (ML-4), 18 | | | Polymer B (89.0X cis-1,4); Mooney viscosity (ML-4), 60 | | | Polymer C (93.5X cis-1,4); Mooney viscosity (ML-4), 54 | | | Natural rubber alone (control) |
|---|---|---|---|---|---|---|---|---|---|---|
| Run No. | 1 | 2 | 3 | 4 | 5 | 6 | 7 | 8 | 9 | 10 |
| Compression set, percent [4] | 25.5 | 22.8 | 21.3 | 16.4 | 16.7 | 17.3 | 14.8 | 15.3 | 16.2 | 21.7 |
| 300% modulus, p.s.i., 80° F.[5] | 990 | 1,000 | 1,220 | f 1,400 | 1,480 | 1,440 | 1,450 | 1,140 | 1,330 | 1,430 |
| Tensile strength, p.s.i., 80° F.[5] | 2,240 | 2,120 | 3,000 | f 1,600 | 2,660 | f 3,600 | 2,200 | 2,580 | 3,390 | f 3,400 |
| Elongation, percent, 80° F.[5] | 530 | 550 | 525 | f 320 | 440 | f 550 | 400 | 470 | 540 | f 505 |
| 200° F. Max. tensile, p.s.i.[5] | 910 | 1,480 | 740 | 1,070 | 1,600 | 2,430 | 1,170 | 1,640 | 2,180 | 2,750 |
| Heat build-up, Δ T, ° F.[6] | 61.5 | 58.1 | 55.1 | 50.3 | 44.2 | 44.6 | 38.8 | 44.6 | 43.9 | 47.9 |
| Resilience, percent [7] | 66.7 | 64.0 | 66.4 | 73.3 | 70.4 | 71.8 | 77.5 | 72.1 | 71.2 | 67.7 |
| Flex life, thousands of flexures to failure [8] | 6.2 | 11.0 | 22.0 | 2.5 | 8.4 | 20.0 | 1.2 | 3.5 | 20.9 | d 13 |
| Shore A hardness [9] | 68 | 66.5 | 67 | 72 | 69 | 67 | 70.5 | 71 | 68.5 | 65 |
| Time to blowout, minutes [10] | 7.7 | 8.0 | 10.3 | 18.9 | 13.2 | 12.8 | c 30 | c 30 | 16.7 | 8.6 |
| Gehman freeze point, ° C.[11] | −91 | −75 | −59 | (b) | e−84 | −68 | (b) | (b) | −63 | −57 |
| Ozone rating: [12] | | | | | | | | | | |
| Three days | 5 | 3 | 3 | 5 | 3 | 3 | 4 | 3 | 3 | 2 |
| Seven days | 10 | 10 | 10 | 10 | 10 | 10 | 10 | 10 | 10 | 4 |

[1] ASTM D927-55T, Mooney viscometer, small rotor, 212° F., 1.5 minutes.
[2] ASTM D1077-55T, Mooney viscometer, large rotor, Scorch in minutes to 5 point rise above minimum Mooney.
[3] No. 1/2 Royle extruder with Garvey die. See Ind. Eng. Chem. 34, 1309 (1942). As regards the "rating" figure, 12 designates an extruded product considered to be perfectly formed whereas lower numerals indicate less perfect products.
[4] ASTM D395-55, Method B (modified). Compression devices are used with 0.325 inch spacers to give a static compression for the one-half inch pellet of 35 percent. Test run for 2 hours at 212° F. plus relaxation for 1 hour at 212° F.
[5] ASTM D412-51T. Scott tensile machine L-6. Tests are made at 80° F. unless otherwise designated.
[6] ASTM D623-52T. Method A, Goodrich flexometer, 143 lbs./sq. in. load, 0.175 inch stroke. Test specimen is a right circular cylinder 0.7 inch in diameter and 1 inch high.
[7] ASTM D945-55 (modified). Yerzley oscillograph. Test specimen is a right circular cylinder 0.7 inch in diameter and 1 inch high.
[8] ASTM D813-52T (modified). DeMattia flexing machine. A punctured specimen is subjected to a bending action at a constant rate under certain conditions of stroke and temperature and the rate of crack growth measured. The DeMattia tester is used in these tests with a 3-inch stroke, 3-inch wide test specimen with 3 pierces in groove, and 500 flexures per minute at 210° F. The results are reported as thousands of flexures to complete break.
[9] ASTM D676-55T. Shore durometer, Type A.
[10] Goodrich flexometer, 257 lbs./sq. in. load, 0.250 inch stroke, 200° F oven temperature. Reported as running time to failure of test specimen
[11] ASTM D1053-54T (modified). Gehman torsional apparatus. Test specimens are 1.625 inches long, 0.125 inch wide and 0.077 inch thick. The angle of twist is measured at 5° C. intervals. Extrapolation to zero twist gives the freeze point.
[12] Samples employed were strips 4 inches long and 0.5 inch wide. They were mounted in racks where they were elongated 25 percent and exposed to air containing 50 parts by volume of ozone per 100 million parts of air. The samples were rated according to the following numerical system:
(1) Surface slightly dulled.
(2) First evidence of attack, "bubbly" appearance on surface.
(3) Roughening of surface, no open cracks.
(4) First evidence of very minute cracks.
(5) Many minute shallow cracks.
(6) Longer shallow cracks.
(7) Deeper cracking, numerous cracks having appearances of very fine tight lace.
(8) More serious cracking, growing quite deep.
(9) Lacework of deep cracks.
(10) Cracks, both deep and numerous.
(a) Decreased in rate after second pass.
(b) Crystallized.
(c) Maximum run.
(d) Percent broken at 50,000 flexures.
(e) Crystallized over a wide range.
(f) Estimated (interpolated value from stress-strain curves).

*Example II*

A number of runs were made wherein natural rubber was blended with various synthetic rubbers by first banding the natural rubber on a roll mill and then adding the cis-polybutadiene. In this example, several cis-polybutadienes were utilized as prepared in the presence of benzene and a catalyst consisting of titanium tetraiodide (TTI) and triisobutylaluminum (TIBA) under the following conditions.

| Polymer | Polymerization Temp. ° F. | Percent conversion | Millimoles TIBA | Millimoles TTI | Mol ratio TIBA/TTI | Mooney ML-4 at 212° F. |
|---|---|---|---|---|---|---|
| A | 0 | 42 | 10.0 | 2.5 | 4/1 | 17 |
| B | 0 | 62 | 13.5 | 1.8 | 7.5/1 | 16 |
| C | 0 | 64 | 9.0 | 1.8 | 5/1 | 16 |
| D | 0 | 25 | 7.5 | 1.5 | 5/1 | 16 |
| E | 0 | 58 | 10.0 | 2.0 | 5/1 | 120 |
| F | 0 | 87 | 11.0 | 2.2 | 5/1 | 37 |

Polymer X is a cis-polybutadiene blend of polymers A–D and has a blended Mooney (ML-4) of 14. The blend contained the following percents of the 4 polymers:

| | Percent |
|---|---|
| A | 42.7 |
| B | 18.4 |
| C | 23.3 |
| D | 15.6 |

Polymer G is a polybutadiene prepared by emulsion polymerization whereas polymer H is a 75/25 butadiene/styrene polymer prepared by emulsion polymerization. Both of these polymers were prepared in processes employing a sulfoxylate activated catalyst system at 41° F. The 75/25 butadiene/styrene was prepared by commercial process.

Polymers X, E, F, G and H were blended with natural rubber as above and compounded according to the following recipes:

| | Parts by Weight | | | | |
|---|---|---|---|---|---|
| | Polymer X, E and F | | Polymer G and H | | #1 S.S. |
| Polymer | 100 | 50 | 100 | 50 | 100 |
| No. 1 smoked sheet | | 50 | | 50 | |
| High abrasion furnace black | 50 | 50 | 50 | 50 | 50 |
| Zinc oxide | 3 | 3 | 3 | 3 | 4 |
| Stearic acid | 2 | 2 | 2 | 2 | 3 |
| Antioxidant [1] | 1 | 1 | 1 | 1 | 1 |
| Disproportionated rosin | 5 | | | | |
| Sulfur | 1.75 | 1.75 | 1.75 | 1.75 | 2 |
| N-cyclohexyl-2-benzothiazole-sulfenamide (accelerator) | [2] Var. | Var. | Var. | Var. | 0.4 |
| Aromatic petroleum oil (plasticizer) | Var. | Var. | 10 | 7.5 | 5.0 |

[1] Same as in Example I. [2] Variable.

These compositions were cured for 30 minutes at 307° F. and the properties determined, employing the test procedures listed in the footnotes to Table I. The data obtained are given in Table II. Values in Table II listed with an (E) beside them are interpolated values while the dashes in this and other tables indicate that that particular value was not obtained.

When one compares the heat build up of the cis-polybutadiene blend with natural rubber with that of the blend of emulsion polymer with natural rubber, it is readily seen that cis-polybutadiene blend approximates the smoked sheet whereas the emulsion blend approximates the emulsion polymer alone. This advantage for the cis-polybutadiene-natural rubber blend is material in fabrication of heavy duty tires.

TABLE II

| Polymer [a] | 50/50 blends of high and low Mooney cis-polybutadiene with natural rubber | | | | | | | | | |
|---|---|---|---|---|---|---|---|---|---|---|
| | X | X | E | E | F | No. 1 S.S. | G | G | H | H |
| Parts by weight: | | | | | | | | | | |
| Butadiene polymer | 100 | 50 | 100 | 50 | 100 | 0 | 100 | 50 | 100 | 50 |
| Natural rubber | -------- | 50 | -------- | 50 | -------- | 100 | -------- | 50 | -------- | 50 |
| Plasticizer, phr.[b] | -------- | 2.5 | 10.0 | 7.5 | 5.0 | 5.0 | 10.0 | 7.5 | 10.0 | 7.5 |
| Accelerator, phr.[b] | 1.0 | 0.8 | 0.9 | 0.65 | 0.9 | 0.4 | 1.6 | 1.0 | 1.2 | 0.8 |
| Processing Data | | | | | | | | | | |
| Mooney, ML-4 at 212° F | 14 | -------- | 120 | -------- | 37 | 100 | 44 | -------- | 52 | -------- |
| Compounded Mooney, MS 1½ at 212° F | 24.5 | 31 | 67 | 68 | 35.5 | 41.5 | 34 | 34 | 30.5 | 37 |
| Extrusion at 250° F.: | | | | | | | | | | |
| Inches/min | 43.3 | 38.5 | (¹) | 39.0 | 32.5 | 51.4 | 32.1 | 32.5 | 44.5 | 40.0 |
| Grams/min | 83.0 | 82.5 | (¹) | 68.0 | 75.0 | 104.0 | 85.0 | 76.0 | 110.0 | 88.5 |
| Rating | 11+ | 11+ | (¹) | 3 | 8 | 11 | 9- | 10 | 11+ | 10+ |
| Cured 30 Minutes at 307° F. | | | | | | | | | | |
| Compression set, percent | 18.0 | 17.0 | 11.6 | 14.8 | 17.4 | 19.9 | 20.4 | 17.2 | 20.4 | 15.3 |
| 300 percent modulus, p.s.i., 80° F | 1,650 | 1,370 | 1,420 | 1,150 | 1,380 | 1,300 | 1,520 | 1,350 | 1,400 | 1,450 |
| Tensile, p.s.i., 80° F | 2,250 | e 2,800 | 2,520 | e 2,800 | 2,000 | 3,050 | 2,120 | 3,330 | 3,680 | 3,530 |
| Elongation, percent, 80° F | 365 | e 490 | 420 | e 525 | 380 | 475 | 370 | 600 | 600 | 540 |
| 200° F. max. tensile, p.s.i | 1,135 | 1,930 | 1,325 | 1,960 | 1,120 | 2,270 | 1,125 | 1,980 | 1,660 | 2,240 |
| Heat build-up, Δ T, °F | 56.8 | 52.7 | 38.8 | 49.7 | 47.9 | 47.6 | 61.5 | 58.1 | 63.5 | 60.8 |
| Resilience, percent | 68.9 | 67.0 | 76.5 | 67.0 | 72.0 | 67.6 | 59.3 | 60.1 | 58.2 | 59.0 |
| Flex life, thousands of flexures to failure | 4.0 | 26.0 | 0.7 | 29.7 | 1.2 | (d) | 2.7 | 24.0 | 23.1 | 34.8 |
| Shore A hardness | 67 | 63 | 63 | 61 | 63 | 60 | 58.5 | 60 | 60 | 62.5 |
| Tear Strength, lb/inch² | 185 | 550 | 185 | 455 | -------- | 495 | 255 | 450 | 420 | 520 |
| Time to blowout, minutes | e 14.0 | 20.0 | e 30.0 | 9.8 | -------- | 9.0 | 8.8 | 9.8 | 9.9 | 8.6 |
| Ozone rating, 3 days | 3 | 2 | 2 | 3 | -------- | 1 | 2 | 3 | 3 | 4 |
| Oven Aged 24 hours at 212° F. | | | | | | | | | | |
| Heat build-up, ΔT, °F | 45.9 | 47.3 | 34.4 | 46.6 | 39.2 | 43.9 | 55.4 | 51.7 | 54.1 | 55.4 |
| Resilience, percent | 75.8 | 70.3 | 79.4 | 69.9 | 77.4 | 68.2 | 64.8 | 65.3 | 63.4 | 62.1 |
| Shore A hardness | 71 | 66 | 65 | 64 | 67.5 | 63 | 62.5 | 64.5 | 64 | 65 |

¹ Crumbled.   ² ASTM D624-54, Die A.
[a] X=Blend of cis 1,4-polybutadiene, Mooney viscosity 14 (ML-4 at 212° F.). cis 1,4-content approximately 90%. E=cis 1,4-polybutadiene, Mooney viscosity 120 (ML-4 at 212° F.). F=cis 1,4-polybutadiene, Mooney viscosity 37 (ML-4 at 212° F.). G=Emulsion polybutadiene. H=Butadiene-styrene copolymer.
[b] Phr.=parts by weight per 100 parts rubber.
c Test discontinued—no blowout occurred.
d Usually breaks to 15% by 50,000 flexures (was 11% at 10,000 flexures).
e Estimated.

*Example III*

Still another series of runs were made in which natural rubber was blended with various synthetic rubbers. These blends are made up as described in Example II. The polymers, alone and in admixture with natural rubber, were compounded according to the following recipes, after which they were cured for 30 minutes at 307° F.

| | Compounding recipes, parts by Weight | |
|---|---|---|
| | Synthetic polymers and blends | Natural rubber alone |
| Polymer | 100 | 100 |
| High abrasion furnace black | 50 | 50 |
| Zinc oxide | 3 | 4 |
| Stearic acid | 2 | 3 |
| Antioxidant ¹ | 1 | 1 |
| Disproportionated rosin | Variable | 0 or 5 |
| Aromatic petroleum oil | 5 | 5 |
| Sulfur | 1.75 | 2 |
| N-cyclohexyl-2-benzothiazylsulfenamide (accelerator) | Variable | 0.4 |

¹ Same as in Example I.

After the polymers and blends were compounded and cured, the physical properties of the materials were determined for both aged and unaged stocks. The properties of these stocks are tabulated below in Table III, and the test procedures used in determining the properties are described in the footnotes to Table I.

TABLE III.—BLENDS OF SYNTHETIC RUBBER WITH NATURAL RUBBER

| Polymer [a] or blend | J | K | L | L | J+L | K+L | J+ No. 1 S.S. | K+ No. 1 S.S. | L+ No. 1 S.S. | No. 1 S.S. | No. 1 S.S. |
|---|---|---|---|---|---|---|---|---|---|---|---|
| Parts by weight: | | | | | | | | | | | |
| Synthetic polymer | 100 | 100 | 100 | 100 | 50 | 50 | 50 | 50 | 50 | 0 | 0 |
| Natural rubber or synthetic polymer | 0 | 0 | 0 | 0 | 50 | 50 | 50 | 50 | 50 | 100 | 100 |
| Accelerator, phr | 0.8 | 1.6 | 1.2 | 1.2 | 1.0 | 1.4 | 0.6 | 1.0 | 0.8 | 0.4 | 0.4 |
| Disproportionated rosin, phr | 5 | 5 | 5 | -------- | 5 | 5 | 5 | 5 | 5 | 5 | -------- |
| Processing Data | | | | | | | | | | | |
| Mooney, ML-4 at 212° F | 45 | 44 | 52 | 52 | (¹) | (¹) | (¹) | (¹) | (¹) | 100 | 100 |
| Compounded Mooney, MS 1½ at 212° F | 50 | 32 | 33 | 34 | 38 | 32 | 42 | 29 | 30 | 28 | 39 |
| Extrusion at 250° F.: | | | | | | | | | | | |
| Inches/min | 29.3 | 29.0 | 43.8 | 43.0 | 38.8 | 34.8 | 44.0 | 37.5 | 46.3 | 49.5 | 52.0 |
| Grams/min | 61.0 | 80.0 | 104.0 | 105.5 | 87.0 | 96.0 | 90.0 | 85.5 | 94.0 | 90.0 | 95.0 |
| Rating | 5- | 10+ | 11+ | 12- | 7+ | 10 | 10- | 11- | 11+ | 11+ | 11+ |

See footnotes at end of table.

TABLE III—Continued

Cured 30 Minutes At 307° F

| Polymers or blend | J | K | L | L | J+L | K+L | J+ No.1 S.S. | K+ No.1 S.S. | L+ No.1 S.S. | No.1 S.S. | No.1 S.S. |
|---|---|---|---|---|---|---|---|---|---|---|---|
| Compression set, percent | 16.0 | 24.4 | 26.2 | 19.1 | 21.0 | 27.4 | 18.2 | 20.2 | 22.7 | 24.8 | 23.9 |
| 300% Modulus, p.s.i., 80° F | 1,060 | 1,170 | 1,150 | 1,740 | 1,070 | 1,200 | 1,120 | 1,240 | 1,210 | 1,240 | 1,550 |
| Tensile, p.s.i., 80° F | 2,150 | ² 2,500 | 3,470 | 3,750 | 2,510 | 2,840 | 3,140 | 3,380 | 3,490 | 3,460 | 3,700 |
| Elongation, percent, 80° F | 470 | ² 480 | 665 | 550 | 525 | 535 | 585 | 610 | 635 | 605 | 535 |
| 200° F. max. tensile, p.s.i | 1,430 | 1,320 | 1,590 | 1,920 | 1,020 | 1,460 | 1,920 | 2,040 | 2,350 | 2,740 | 3,020 |
| Heat build-up, Δ T, ° F | 41.9 | 68.3 | 75.3 | 61.5 | 58.1 | 71.9 | 46.9 | 58.5 | 63.5 | 47.3 | 42.6 |
| Time to blowout, minutes | 22.3 | 7.4 | 5.0 | 11.3 | 15.3 | 6.3 | 14.1 | 8.8 | 6.5 | 6.9 | 6.4 |
| Flex life, thousands of flexures to failure | 1.4 | 2.8 | 3.9 | 23.0 | 4.5 | 3.6 | 8.0 | 20.4 | ᵇ 56.4 | ᶜ 12.5 | ᶜ 15.0 |
| Shore A hardness | 62 | 57.5 | 59 | 63.5 | 59.5 | 59 | 60 | 59 | 59.5 | 58.5 | 61.5 |
| Ozone rating, 8 days | 7 | 10 | 10 | 10 | 9 | 10 | 8 | 9 | 9 | 3 | 2 |

Oven Aged 24 Hours At 212° F.

| | | | | | | | | | | | |
|---|---|---|---|---|---|---|---|---|---|---|---|
| 300% Modulus, p.s.i., 80° F | | 2,190 | 2,180 | 2,790 | | 2,175 | 1,625 | 2,025 | 1,760 | 1,675 | 1,950 |
| Tensile, p.s.i., 80° F | 1,075 | 2,470 | 3,650 | 3,480 | 1,650 | 3,080 | 2,280 | 3,000 | 3,150 | 2,680 | 2,810 |
| Elongation, percent, 80° F | 215 | 330 | 470 | 370 | 400 | 380 | 410 | 490 | 450 | 410 |
| Heat build-up, ΔT, ° F | 37.5 | 54.4 | 55.8 | 53.4 | 47.6 | 55.1 | 44.9 | 51.3 | 54.1 | 40.5 | 39.2 |
| Flex life, thousands of flexures to failure | <0.1 | 0.4 | 2.8 | 1.5 | 0.9 | 1.1 | ᶜ 47.0 | 10.7 | 8.4 | 33.0 | 23.0 |
| Shore A hardness | 67 | 63.5 | 64.5 | 68 | 65 | 65 | 63.5 | 65 | 65.5 | 62.5 | 65 |

¹ Not measured.  ² Estimated.
ᵃ Polymer J is a cis-polybutadiene which was prepared by polymerization at 41° F. using a 5/1 mol ratio of triisobutylaluminum/titanium tetraiodide. This polymer contained 95.5% cis linkage, 1.0% trans linkage, and 3.5% vinyl linkage as determined by the complete infrared method described by Silas, Yates and Thornton in "Determination of Unsaturation Distribution in Polybutadiene by Infrared Spectrometry", Analytical Chemistry 31, 529 (1959). Polymer K is identical to Polymer G (emulsion polybutadiene) of Example II. Polymer L is identical to Polymer H (butadiene-styrene copolymer) of Example II. No. 1 S.S. is top grade smoked sheet (natural rubber).
ᵇ Broke vertically instead of horizontally.
ᶜ Percent broken at 50,000 flexures.

*Example IV*

Still another series of runs were made in which natural rubber was blended with a butadiene polymer which contained a very high amount of cis-1,4-configuration. The blends, and the runs in which the cis-polybutadiene and natural rubber were used alone, were compounded according to the following recipes. The cis-1,4-polybutadiene was prepared by polymerization in toluene diluent using a mol ratio of triisobutylaluminum to titanium tetraiodide of 3.75/1.0. The cis-polybutadiene used in the blends was a composite of polymers from 6 runs, all of which were made at 20° F., using water as the shortstop. The composite, which contained 2 parts/100 parts rubber of phenyl-beta-naphthylamine, had a Mooney viscosity (ML–4) of 26, and a cis content of 91.4 percent, a trans content of 4.4 percent, and a vinyl content of 4.2 percent as determined by the infrared method of Silas, Yates and Thornton referred to in the footnote to Table III.

| | Compounding recipes, parts by weight | | |
|---|---|---|---|
| Cis-polybutadiene | 0 | Variable | 100 |
| No. 1 smoked sheet | 100 | Variable | 0 |
| High abrasion furnance black | 50 | 50 | 50 |
| Zinc oxide | 3 | 3 | 3 |
| Stearic acid | 2 | 2 | 2 |
| Antioxidant ¹ | 1 | 1 | 1 |
| Disproportionated rosin | 5 | Variable | 5 |
| Aromatic petroleum oil | 5 | 5 | 5 |
| Sulfur | 1.75 | 1.75 | 1.75 |
| Accelerator ² | 0.6 | Variable | 1.0 |

¹ Same as in Example I.
² Same as in Example III.

After compounds, the rubbers were cured for 30 minutes at 307° F. except where noted. The physical properties of the cured rubbers, which were determined by the test procedures referred to in the footnotes to Table I, are recorded below in Table IV.

TABLE IV

| Polymer or blend | M | N | P | R | S | T | V | X |
|---|---|---|---|---|---|---|---|---|
| Parts by weight: | | | | | | | | |
| Cis-polybutadiene | 0 | 10 | 25 | 50 | 75 | 90 | 100 | 50 |
| Natural rubber | 100 | 90 | 75 | 50 | 25 | 10 | 0 | 50 |
| Accelerator, phr | 0.6 | 0.64 | 0.7 | 0.8 | 0.9 | 0.96 | 1.00 | 0.8 |
| Disproportionated rosin, phr | 5 | 5 | 5 | 5 | 5 | 5 | 5 | 0 |

Processing Data

| | | | | | | | | |
|---|---|---|---|---|---|---|---|---|
| Compounded Mooney, MS 1½ at 212° F | 36.5 | | 36 | 34.5 | 34 | 32.5 | 32.5 | 41.5 |
| Extrusion at 195° F.: | | | | | | | | |
| Inches/min | 45.5 | 48.4 | 48.5 | 47.9 | 46.5 | 44.0 | 41.0 | 46.0 |
| Grams/min | 85.5 | 90.5 | 94.0 | 99.0 | 101.0 | 96.5 | 91.0 | 96.5 |
| Rating | 11+ | 11 | 11 | 11 | 11+ | 11+ | 11 | 11+ |

Cured 30 Minutes at 307° F.

| | | | | | | | | |
|---|---|---|---|---|---|---|---|---|
| Compression set, percent | 18.3 | 18.2 | 16.6 | 17.8 | 18.0 | 18.5 | 19.2 | 16.5 |
| 300% Modulus, p.s.i., 80° F | 1,300 | 1,320 | 1,450 | 1,320 | 1,280 | 1,230 | 1,160 | 1,500 |
| Tensile strength, p.s.i., 80° F | ¹ 3,650 | 3,570 | 3,480 | 3,080 | 2,410 | 2,150 | ¹ 1,900 | 3,080 |
| Elongation, percent, 80° F | ¹ 575 | 555 | 560 | 550 | 460 | 440 | ¹ 440 | 500 |
| 200° F. max. tensile, p.s.i | 2,715 | 2,650 | ¹ 2,500 | 1,935 | 1,180 | 1,030 | 915 | 1,780 |
| Heat build-up, Δ T, ° F | 46.6 | 46.3 | 46.3 | 49.0 | 49.3 | 49.3 | 51.0 | 49.3 |
| Resilience, percent | 68.6 | 68.5 | 69.1 | 68.0 | 69.4 | 71.3 | 70.9 | 71.6 |
| Time to blowout, minutes | 9.9 | 10.5 | 14.4 | 15.8 | ¹ 15 | 15.5 | 16.8 | 8.8 |
| Flex life, thousands of flexures to failure | ² 15 | ² 16 | ² 14.5 | 12.1 | 5.6 | 2.4 | 1.3 | 18.0 |
| Shore A hardness | 58 | 59 | 60.5 | 60 | 62 | 62 | 62.5 | 63 |
| Tear strength at 80° F., lb./inch | 455 | 530 | 420 | 430 | 280 | 155 | 175 | 530 |

See footnotes at end of table.

TABLE IV—Continued

Oven Aged 24 Hours at 212° F.

| Polymer or blend | M | N | P | R | S | T | V | X |
|---|---|---|---|---|---|---|---|---|
| 300% modulus, p.s.i., 80° F | ¹1,575 | 1,590 | 1,680 | 1,950 | | | | 2,080 |
| Tensile strength, p.s.i., 80° F | ¹2,200 | 2,100 | 2,010 | ¹2,050 | 1,700 | 1,620 | 1,550 | 2,260 |
| Elongation, percent, 80° F | ¹415 | 375 | 360 | ¹340 | 265 | 240 | 220 | 310 |
| Heat build-up, Δ T, ° F | 43.3 | 45.6 | 43.9 | 44.9 | 45.6 | 43.6 | 48.7 | 48.7 |
| Resilience, percent | 71.1 | 68.2 | 71.9 | 72.3 | 72.8 | 76.2 | 75.5 | 72.9 |
| Flex life, thousands of flexures to failure | 35.0 | 20.4 | 47.4 | 14.6 | 1.8 | <0.1 | <0.1 | ²56.7 |
| Shore A hardness | 61 | 62.5 | 63.5 | 64.5 | 67 | 67 | 68 | 66 |

¹ Estimated.  ² Percent broken at 50,000 flexures.

Example V

A series of runs was made wherein new 7:60 x 15 tire carcasses were retreaded by using half and half retread construction, i.e., ½ of the tire circumference is covered with one tread composition and ½ with a second tread composition. These tires were placed on a Dodge station wagon operating on a regular route in the southwest.

The cis-polybutadiene rubber was one prepared as in Example I, employing a triisobutylaluminum-titanium tetraiodide catalyst. Infrared examination of polymer used in the tests according to the method of Silas, Yates and Thornton referred to in the footnote to Table III indicated that the polymer contained 95 percent cis, 2 percent trans, and 3 percent vinyl configuration. These polymers contanied 1.8 percent phenyl-β-naphthylamine antioxidant. All polymers were gel free. Mooney viscosities were 35 to 45 (ML-4 at 212° F.) unless otherwise indicated.

The SBR (styrene-butadiene copolymer rubber) was a copolymer containing 24 percent bound styrene prepared by emulsion polymerization in an iron-activated recipe at 41° F. This rubber had a mean ML-4 Mooney at 212° F. of 52.

The natural rubber was premasticated #1 Smoked Sheets.

The rubbers were compounded according to the following compounding recipes.

| | Compounding recipes, parts by weight | | |
|---|---|---|---|
| | Test blend | Natural rubber | SBR |
| Cis-polybutadiene | 50 | | |
| Natural rubber | 50 | 100 | |
| SBR | | | 100 |
| High abrasion furnace black | 50 | 50 | 50 |
| Zinc oxide | 3 | 3 | 3 |
| Stearic acid | 3 | 3 | 1 |
| Antioxidant | 1 | 1 | 1 |
| Disproportionated rosin | 5 | | |
| A highly aromatic petroleum oil | 5 | 5 | 10 |
| Sulfur | Variable | 2 | 1.75 |
| N-oxydiethylene-2-benzothiazylsulfenamide | 0.6 | | |
| N-cyclohexyl-2-benzothiazylsulfenamide | | 0.4 | 1.2 |

The results of these tests are tabulated below.

| Tire | Tread | Phr. sulfur | Total miles | Miles/.001" wear | Rating NR=100 | Tread cracking |
|---|---|---|---|---|---|---|
| 1 | 50/50 test blend | 2 | 9,782 | 96.8 | 125 | None. |
| | Natural rubber | 2 | 9,782 | 77.6 | 100 | Extensive surface. |
| 2 | 50/50 test blend | ¹1.25 | 7,341 | 94.7 | 124 | None.² |
| | Natural rubber | 2 | 7,341 | 76.2 | 100 | Extensive surface. |
| 1 | 50/50 test blend | 2 | 12,245 | 90.1 | 121 | None. |
| | Natural rubber | 2 | 12,245 | 70.4 | 100 | Extensive surface. |
| 3 | 50/50 test blend | 2 | 3,236 | 73.9 | 116 | None. |
| | SBR | 1.75 | 3,236 | 63.5 | 100 | Do. |
| 4 | 50/50 test blend | 2 | 3,259 | 71.5 | 124 | Do. |
| | SBR | 1.75 | 3,259 | 57.8 | 100 | Do. |
| 3 | 50/50 test blend | 2 | 6,531 | 74.0 | 113 | Do. |
| | SBR | 1.75 | 6,531 | 65.2 | 100 | Do. |
| 4 | 50/50 test blend | 2 | 6,553 | 75.3 | 118 | Do. |
| | SBR | 1.75 | 6,553 | 63.8 | 100 | Do. |
| 3 | 50/50 test blend | 2 | 9,722 | 79.9 | 111 | Do. |
| | SBR | 1.75 | 9,722 | 71.8 | 100 | Do. |
| 4 | 50/50 test blend | 2 | 8,997 | 81.1 | 114 | Do. |
| | SBR | 1.75 | 8,997 | 71.1 | 100 | Do. |

¹ Contained 1.2 phr. N-oxydiethylene-2-benzothiazylsulfenamide.
² Tire removed due to side wall failure.

Example VI

Four truck tires were capped ½ with blend as in Example V and ½ with natural rubber. The blend had a 2 parts by weight of sulfur per 100 parts of rubber in the compounding recipe whereas with the natural rubber 2.25 parts by weight of sulfur per 100 parts of rubber was used. The cis-polybutadiene used in preparing the test blend was a blend of polymers obtained from 6 runs carried out according to the Smith et al. method as described in Example I. The products from two of these runs were examined by infrared analysis according to the method of Silas, Yates and Thornton mentioned in the footnote to Example III and found to contain 93.6 and 94.4 cis 1,4-addition. These tires were 10.00 x 20 truck tires and were placed on trucks to be tested by the Armstrong Test Fleet at San Antonio, Texas. At the end of approximately 3,000 miles, the following data was obtained.

| Tire | Tread | Total miles | Miles/.001" wear | Rating NR=100 | Tread cracking | Remarks |
|---|---|---|---|---|---|---|
| 1 | Natural rubber | 3,128 | 41 | 100 | None | |
| | 50/50 test blend | 3,128 | 45 | 110 | do | |
| 2 | Natural rubber | 3,128 | 40 | 100 | do | |
| | 50/50 test blend | 3,128 | 44 | 110 | do | |
| 3 | Natural rubber | 3,128 | 40 | 100 | do | |
| | 50/50 test blend | 3,128 | 43 | 108 | do | |
| 4 | Natural rubber | 2,919 | 53 | 100 | do | Carcass failure between shoulder and side wall. |
| | 50/50 test blend | 2,919 | 65 | 123 | do | |

From the above examples, it can be seen that tires treaded with the blend of cis-polybutadiene and natural rubber are generally superior to the natural rubber alone and to a commercially acceptable cold rubber.

*Example VII*

Butadiene was polymerized to cis-polybutadiene in a series of runs using a triisobutylaluminum-titanium tetraiodide catalyst system. The polymers were blended to give a product having the following characteristics:

| | |
|---|---|
| Mooney value (ML–4) at 212° F. | 36 |
| Ash, percent | 0.14 |
| Inherent viscosity | 2.23 |
| Gel, percent | 0 |

Infrared examination of the cis-polybutadiene by the method of Silas, Yates and Thornton mentioned in the footnote to Example III indicated that the polymer contained 94 percent cis 1,4-addition, 2.3 percent trans 1,4-addition and 3.7 percent 1,2-addition. The polymer contained 1.79 weight percent phenyl-beta-naphthylamine.

The cis-polybutadiene was blended in equal weight proportions with a synthetic cis-polyisoprene and with natural rubber. The cis-polyisoprene was a sample of Coral rubber (Firestone Tire and Rubber Co.) which is described more completely in "Coral Rubber-A Cis 1,4-Polyisoprene," Ind. and Eng. Chem. 48, 778 (1956). Based on a comparison with a standard sample of natural rubber containing 98 percent cis 1,4-addition, this cis-polyisoprene was determined by infrared examination to contain 89±2 percent cis 1,4-addition and 7.6±0.2 percent 3,4-addition. These blends were compounded using the following formulations:

| | Compounding recipes, parts by weight | |
|---|---|---|
| | 1 | 2 |
| Cis-polybutadiene | 50 | 50 |
| Cis-polyisoprene | 50 | |
| Natural rubber | | 50 |
| Philblack O [1] | 50 | 50 |
| Zinc oxide | 3 | 3 |
| Stearic acid | 3 | 3 |
| Flexamine [2] | 1 | 1 |
| Philrich 5 [3] | 5 | 5 |
| Resin 731 D [4] | 5 | 5 |
| Sulfur | 2 | 2 |
| NOBS special [5] | 0.7 | 0.6 |

[1] High abrasion furnace black.
[2] Physical mixture containing 65 percent by weight of a complex diarylamine-ketone reaction product and 35 percent by weight of N,N′-diphenyl-p-phenylenediamine.
[3] A highly aromatic oil.
[4] A disproportionated pale rosin stable to heat and light.
[5] N-oxydiethylene-2-benzothiazylsulfenamide.

One set of samples was cured for 30 minutes while another set was cured for 45 minutes, both at 292° F. Results of determinations of physical properties are set forth below in Table V. The physical properties were determined according to the test procedures referred to in the footnotes to Table I.

TABLE V

| | 1 [1] | 2 [2] |
|---|---|---|
| 30 minute cure at 292°F.: | | |
| Compression set, percent | 27.5 | 34.8 |
| 300% modulus, p.s.i., 80°F | 1,100 | 980 |
| Tensile, p.s.i., 80°F | 3,480 | 3,310 |
| Elongation, percent, 80°F | 570 | 625 |
| Heat build-up, ΔT, °F | 43.3 | 53.0 |
| Resilience, percent | 70.7 | 67.9 |
| Shore A hardness | 56.5 | 54.5 |
| 45 Minute Cure at 292°F.: | | |
| 300% modulus, p.s.i., 80°F | 1,040 | 1,190 |
| Tensile, p.s.i., 80°F | 3,080 | 3,470 |
| Elongation, percent, 80°F | 510 | 590 |
| Heat build-up, ΔT, °F | 40.9 | 45.9 |
| Resilience, percent | 71.7 | 70.6 |

[1] 50/50 blend of cis-polybutadiene and cis-polyisoprene.
[2] 50/50 blend of cis-polybutadiene and natural rubber.

The foregoing data show that the all-synthetic composition (cis-polybutadiene and cis-polyisoprene) has properties which compare favorably with those of the natural rubber composition.

*Example VIII*

A cis-polybutadiene prepared as described in Example I was blended in equal weight proportions with a synthetic cis-polyisoprene, which was a sample of Natsyn rubber (Goodyear Tire and Rubber Co.) (Chem. & Eng. News, Jan. 19, 1959, p. 50). Based on a standard sample of natural rubber containing 98 percent cis 1,4-addition, this cis-polyisoprene was determined by infrared examination to contain 90±2 percent cis 1,4-addition and 4.5±0.2 percent 3,4-addition. This blend and also synthetic cis-polyisoprene alone and natural rubber alone were compounded in accordance with the following recipes:

| | Compounding recipes, parts by weight | | |
|---|---|---|---|
| | 1 | 2 | 3 |
| Cis-polybutadiene | 50 | | |
| Cis-polyisoprene (synthetic) | 50 | 100 | |
| Natural rubber | | | 100 |
| Pepton 22 [1] | | | 0.5 |
| Philblack O [2] | 50 | 50 | 50 |
| Zinc oxide | 3 | 3 | 3 |
| Stearic acid | 3 | 3 | 3 |
| Flexamine [2] | 1 | 1 | 1 |
| Philrich 5 [2] | 5 | | |
| Resin 731 [3] | 5 | | |
| Pine tar | | 3 | 3 |
| Retarder W [4] | | | 1 |
| Sulfur | 2 | 2.25 | 2.25 |
| NOBS Special [2] | 0.8 | 0.7 | 0.5 |

[1] Di-o-benzamidophenyl disulfide.
[2] As in Example I.
[3] A disproportionated pale rosin stable to heat and light.
[4] Salicylic acid with a dispersing agent.

Physical properties of the above compositions were determined, and the results are set forth below in Table VI. It is noted that the first three properties tested in the table are for the compositions in their uncured state while the other properties are for compositions cured for 30 minutes at 307° F. The physical properties were determined according to the test procedures described in the footnotes to Tables I and VI.

TABLE VI

| | 1 [1] | 2 [2] | 3 [3] |
|---|---|---|---|
| MS 1½ at 212° F | 26 | 18 | 29 |
| Scorch at 280° F., min. to 5 point Mooney rise | 26 | 18.5 | 9.5 |
| Extrusion rating, Garvey die | 11+ | 11+ | 11+ |
| ν×10⁴, moles/cc.[4] | 1.74 | 1.53 | 1.88 |
| Compression set, percent | 19.8 | 21.9 | 15.4 |
| 300% Modulus, p.s.i., 80° F | 1,565 | 1,640 | 2,135 |
| Tensile, p.s.i., 80° F | 2,680 | 3,035 | 3,790 |
| Elongation, percent, 80° F | 440 | 495 | 485 |
| Heat build-up, ΔT, ° F | 40.5 | 43.9 | 39.5 |
| Resilience, percent | 72.3 | 71.9 | 73.2 |
| Time to blowout, minutes | 22.0 | 10.8 | 14.8 |
| ΔT, ° F. at 10 min | 90.0 | 175.4 | 107.6 |
| Shore A hardness | 65 | 63.5 | 70 |
| Abrasion loss, grams [5] | 7.07 | 10.60 | 8.42 |

[1] 50/50 blend of cis-polybutadiene and cis-polyisoprene.
[2] Cis-polyisoprene.
[3] Natural rubber.
[4] Determined by the swelling method of Kraus as given in Rubber World, October 1946. This value is the number of effective network chains per unit volume of rubber. The higher the number, the more the rubber is crosslinked (vulcanized).
[5] Determined by noting the loss in weight of a doughnut shaped rubber wheel which has been subjected to the abrasive action of a carborundum wheel on the angle abrader for a certain length of time. The wheel used is 24 inches in diameter, 1½ inches thick, Grade M, Vitreous, grain size No. 36 alundum purchased from Norton Company, Worcester, Mass. The normal test conditions are 15° angle, 33½ pounds load and 3,000 revolutions.

The foregoing data show that the all-synthetic composition has properties which compare favorably with natural rubber, particularly as regards heat build-up, blowout time, and abrasion loss.

Example IX

The rubber compounds 1, 2 and 3 of Example VIII were used to make three-way retreads on 7.60 x 15 tire carcasses. The following results were obtained after the tires were run 3,083 miles:

| Tire tread | Miles/ 0.001″ Wear | Rating [1] | Tread cracking |
|---|---|---|---|
| 1. 50/50 blend | 58.3 | 114 | None. |
| 2. Cis-polyisoprene | 50.4 | 98 | Do. |
| 3. Natural rubber | 51.3 | 100 | Do. |

[1] Natural rubber=100.

As will be evident to those skilled in the art, many variations and modifications can be produced which fall within the spirit and scope of the disclosure of this invention.

We claim:

1. As a new composition of matter, a blend of rubbers comprising (1) in the range of 10 to 90 parts by weight of a polybutadiene formed by cis 1,4-, trans 1,4- and 1,2-addition of 1,3-butadiene, at least 75 percent of said polybutadiene being formed by cis 1,4-addition of 1,3-butadiene and (2) in the range of 90 to 10 parts by weight of a cis-polyisoprene, the aforementioned parts by weight ranges being based on 100 parts by weight of total rubbers contained in the blend.

2. The vulcanized product of claim 1.

3. The composition of claim 1 in which said cis-polyisoprene is natural rubber.

4. The composition of claim 1 in which said cis-polyisoprene is a synthetic cis-polyisoprene.

5. As a new composition of matter, a blend of rubbers comprising (1) in the range of 40 to 50 parts by weight of a polybutadiene formed by cis 1,4-, trans 1,4- and 1,2-addition of 1,3-butadiene, at least 85 percent of said polybutadiene being formed by cis 1,4-addition of 1,3-butadiene and (2) in the range of 60 to 50 parts by weight of a cis-polyisoprene, the aforementioned parts by weight ranges being based on 100 parts by weight of total rubbers contained in the blend.

6. The composition of claim 5 in which said polybutadiene has a Mooney ML-4 viscosity in the range of 20 to 60 as measured on a Mooney viscosimeter at 212° F.

7. A method of preparing a blend of rubbers which comprises blending in the range of 10 to 90 parts by weight of a polybutadiene formed by cis 1,4-, trans 1,4- and 1,2-addition, at least 75 percent of said polybutadiene being formed by cis 1,4-addition of 1,3-butadiene within the range of 90 to 10 parts by weight of a cis-polyisoprene, the aforementioned parts by weight ranges being based on 100 parts by weight of total rubbers contained in the blend; and vulcanizing the resulting blend.

8. A method of preparing a blend of rubbers which comprises blending in the range of 25 to 75 parts by weight of a polybutadiene formed by cis 1,4-, trans 1,4- and 1,2-addition, at least 75 percent of said polybutadiene being formed by cis 1,4-addition of 1,3-butadiene within the range of 75 to 25 parts by weight of a cis-polyisoprene, the aforementioned parts by weight ranges being based on 100 parts by weight of total rubbers contained in the blend; and said polybutadiene having a Mooney ML-4 viscosity in the range of 10 to 130 as measured on a Mooney viscosimeter at 212° F.; and incorporating a vulcanizing agent into the resulting blend.

9. A method of preparing a blend of rubbers which comprises blending in the range of 40 to 50 parts by weight of a polybutadiene formed by cis 1,4-, trans 1,4- and 1,2-addition, at least 75 percent of said polybutadiene being formed by cis 1,4-addition of 1,3-butadiene within the range of 60 to 50 parts by weight of a cis-polyisoprene, the aforementioned parts by weight ranges being based on 100 parts by weight of total rubbers contained in the blend and said polybutadiene having a Mooney ML-4 viscosity in the range of 20 to 60 as measured on a Mooney viscosimeter at 212° F.; incorporating sulfur into the resulting blend; and heating the blend so as to effect vulcanization.

10. In an automotive tire comprising a carcass and tread, the improvement which comprises a tread prepared from the composition of claim 1.

References Cited in the file of this patent

UNITED STATES PATENTS

| 2,688,605 | Tucker | Sept. 7, 1954 |
| 2,832,759 | Nowlin et al. | Apr. 29, 1958 |
| 2,953,556 | Wolfe et al. | Sept. 20, 1960 |
| 2,977,349 | Brockway et al. | Mar. 28, 1961 |

OTHER REFERENCES

Binder: "Microstructures of Polybutadiene and Butadiene-Styrene Copolymers," Ind. Eng. Chem., volume 46, No. 8, August 1954, pages 1727–1730.

Rubber World, volume 138, No. 2, May 1958, page 280 relied upon.